(12) United States Patent
Tokita

(10) Patent No.: US 11,979,805 B2
(45) Date of Patent: May 7, 2024

(54) CONTROL METHOD, COMMUNICATION TERMINAL, AND COMMUNICATION SYSTEM

(71) Applicant: HONDA MOTOR CO., LTD., Tokyo (JP)

(72) Inventor: Kaname Tokita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 374 days.

(21) Appl. No.: 17/352,988

(22) Filed: Jun. 21, 2021

(65) Prior Publication Data

US 2021/0314755 A1 Oct. 7, 2021

Related U.S. Application Data

(63) Continuation of application No. PCT/JP2018/048564, filed on Dec. 28, 2018.

(51) Int. Cl.
*H04W 4/46* (2018.01)
*H04W 4/02* (2018.01)
*H04W 4/029* (2018.01)

(52) U.S. Cl.
CPC .............. *H04W 4/46* (2018.02); *H04W 4/023* (2013.01); *H04W 4/029* (2018.02)

(58) Field of Classification Search
None
See application file for complete search history.

(56) References Cited

U.S. PATENT DOCUMENTS

| 8,754,788 B2 | 6/2014 | Yamamoto |
| 9,294,984 B2 | 3/2016 | Takahashi |
| 9,743,336 B2 | 8/2017 | Takahashi |

(Continued)

FOREIGN PATENT DOCUMENTS

| CN | 101026890 A | 8/2007 |
| CN | 105984527 A | 10/2016 |

(Continued)

OTHER PUBLICATIONS

International Search Report for PCT/JP2018/048564 dated Mar. 5, 2019.

(Continued)

*Primary Examiner* — Frantz Bataille
(74) *Attorney, Agent, or Firm* — Thomas| Horstemeyer, LLP

(57) ABSTRACT

The transmission-side terminal acquires a position of the reception-side terminal, using at least one of a camera and a sensor; and transmits identification information in which an identification range including the position of the reception-side terminal is specified. The reception-side terminal acquires the position of the reception-side terminal; determines whether the position of the reception-side terminal is included in the identification range specified in the identification information transmitted; and performs control to continue communication with the transmission-side terminal, if it is determined that the position of the reception-side terminal is included in the identification range, and performs control to end communication with the transmission-side terminal, if it is determined that the position of the reception-side terminal is not included in the identification range.

18 Claims, 10 Drawing Sheets

(56) References Cited

U.S. PATENT DOCUMENTS

| | | | |
|---|---|---|---|
| 9,893,767 | B2 | 2/2018 | Toya |
| 2007/0202864 | A1 | 8/2007 | Sasao |
| 2011/0012756 | A1 | 1/2011 | Yamamoto |
| 2012/0275373 | A1* | 11/2012 | Takahashi ............. H04W 40/20 370/315 |
| 2015/0271734 | A1 | 9/2015 | Takahashi |
| 2015/0271735 | A1 | 9/2015 | Takahashi |
| 2016/0285516 | A1 | 9/2016 | Toya |
| 2017/0076599 | A1* | 3/2017 | Gupta ...................... B60Q 9/00 |

FOREIGN PATENT DOCUMENTS

| | | |
|---|---|---|
| CN | 106603643 A | 4/2017 |
| JP | 2004-199587 A | 7/2004 |
| JP | 2004-297422 A | 10/2004 |
| JP | 2004-364223 A | 12/2004 |
| JP | 2005-045340 A | 2/2005 |
| JP | 2005-286557 A | 10/2005 |
| JP | 2008-046820 A | 2/2008 |
| JP | 2008-176370 A | 7/2008 |
| JP | 2009-212753 A | 9/2009 |
| JP | 2011-160418 A | 8/2011 |
| JP | 2011-191814 A | 9/2011 |
| JP | 2015-007904 A | 1/2015 |
| JP | 2015-211260 A | 11/2015 |
| JP | 2016-018474 A | 2/2016 |
| JP | 2016-136375 A | 7/2016 |
| WO | 2020/136893 A1 | 7/2020 |

OTHER PUBLICATIONS

Chinese Office Action for Chinese Patent Application No. 201880099109.1 dated Apr. 19, 2023.

* cited by examiner

CONTROL METHOD, COMMUNICATION TERMINAL, AND COMMUNICATION SYSTEM

CROSS-REFERENCE TO RELATED APPLICATION(S)

This application is a continuation of International Patent Application No. PCT/JP2018/048564 filed on Dec. 28, 2018, the entire disclosures of which are incorporated herein by reference.

TECHNICAL FIELD

The present invention relates to a control method, a communication terminal and a communication system that are capable of vehicle-to-vehicle communication.

BACKGROUND ART

In an environment in which vehicle-to-vehicle communication and road-to-vehicle communication are viable, enhancements in driving performance and improvements in user-friendliness have been widely carried out. PTL1 describes making calls and sending messages by directly specifying vehicles with which it is desired to make contact on a screen, in order to simplify operations for making calls and sending messages between vehicles. Also, PTL2 describes enabling reconfiguration of the traveling formation, without changing communication IDs. Also, PTL3 describes the positions and communication areas of other vehicles acquired through vehicle-to-vehicle communication being displayed together on a map of a display unit such as a car navigation screen.

CITATION LIST

Patent Literature

PTL1: Japanese Patent Laid-open No. 2005-286557
PTL2: Japanese Patent Laid-open No. 2008-46820
PTL3: Japanese Patent Laid-open No. 2011-191814

SUMMARY OF INVENTION

Technical Problem

In the environment is which vehicle-to-vehicle communication and road-to-vehicle communication are viable, there are cases where broadcast communication is performed, in order to efficiently use communication resources through channel sharing, for example. Even in such cases, there are calls to appropriately identify communication targets.

The present invention provides a control method, a communication terminal and a communication system for appropriately identifying communication targets.

Solution to Problem

The present invention in its first aspect provides a control method to be executed in a communication system including a transmission-side terminal and a reception-side terminal, the method comprising: the transmission-side terminal acquiring a position of the reception-side terminal, using at least one of a camera and a sensor; and transmitting identification information in which an identification range including the position of the reception-side terminal is specified, and the reception-side terminal acquiring the position of the reception-side terminal; determining whether the position of the reception-side terminal is included in the identification range specified in the identification information transmitted from the transmission-side terminal; and performing control to continue communication with the transmission-side terminal, if it is determined that the position of the reception-side terminal is included in the identification range specified in the identification information, and performing control to end communication with the transmission-side terminal, if it is determined that the position of the reception-side terminal is not included in the identification range specified in the identification information.

The present invention in its second aspect provides a communication terminal communicable with an external device, comprising: at least one processor, which executes instructions stored in at least one memory, being configured to: acquire a position of the communication terminal, receive identification information in which an identification range including the position of the communication terminal is specified from the external device, determine whether the position of the communication terminal is included in the identification range specified in the identification information transmitted from the external device, and perform control to continue communication with the external device if it is determined that the position of the communication terminal is included in the identification range specified in the identification information, and perform control to end communication with the external device, if it is determined that the position of the communication terminal is not included in the identification range specified in the identification information.

The present invention in its third aspect provides a communication system including a transmission-side terminal and a reception-side terminal, the transmission-side terminal comprising: at least one processor, which executes instructions stored in at least one memory, being configured to: acquire a position of the reception-side terminal, using at least one of a camera and a sensor, and transmit identification information in which an identification range including the position of the reception-side terminal is specified, and the reception-side terminal comprising: at least one processor, which executes instructions stored in at least one memory, being configured to: acquire the position of the reception-side terminal, determine whether the position of the reception-side terminal is included in the identification range specified in the identification information transmitted from the transmission-side terminal, and perform control to continue communication with the transmission-side terminal, if it is determined that the position of the reception-side terminal is included in the identification range specified in the identification information, and perform control to end communication with the transmission-side terminal, if it is determined that the position of the reception-side terminal is not included in the identification range specified in the identification information.

Advantageous Effects of Invention

According to the present invention, communication targets can be appropriately identified.

Further features of the present invention will become apparent from the following description of exemplary embodiments with reference to the attached drawings. Note that the same reference numerals denote the same or like components throughout the accompanying drawings.

BRIEF DESCRIPTION OF DRAWINGS

The accompanying drawings, which are incorporated in and constitute a part of the specification, illustrate embodiments of the invention and, together with the description, serve to explain principles of the invention.

DESCRIPTION OF EMBODIMENTS

Figure 1:
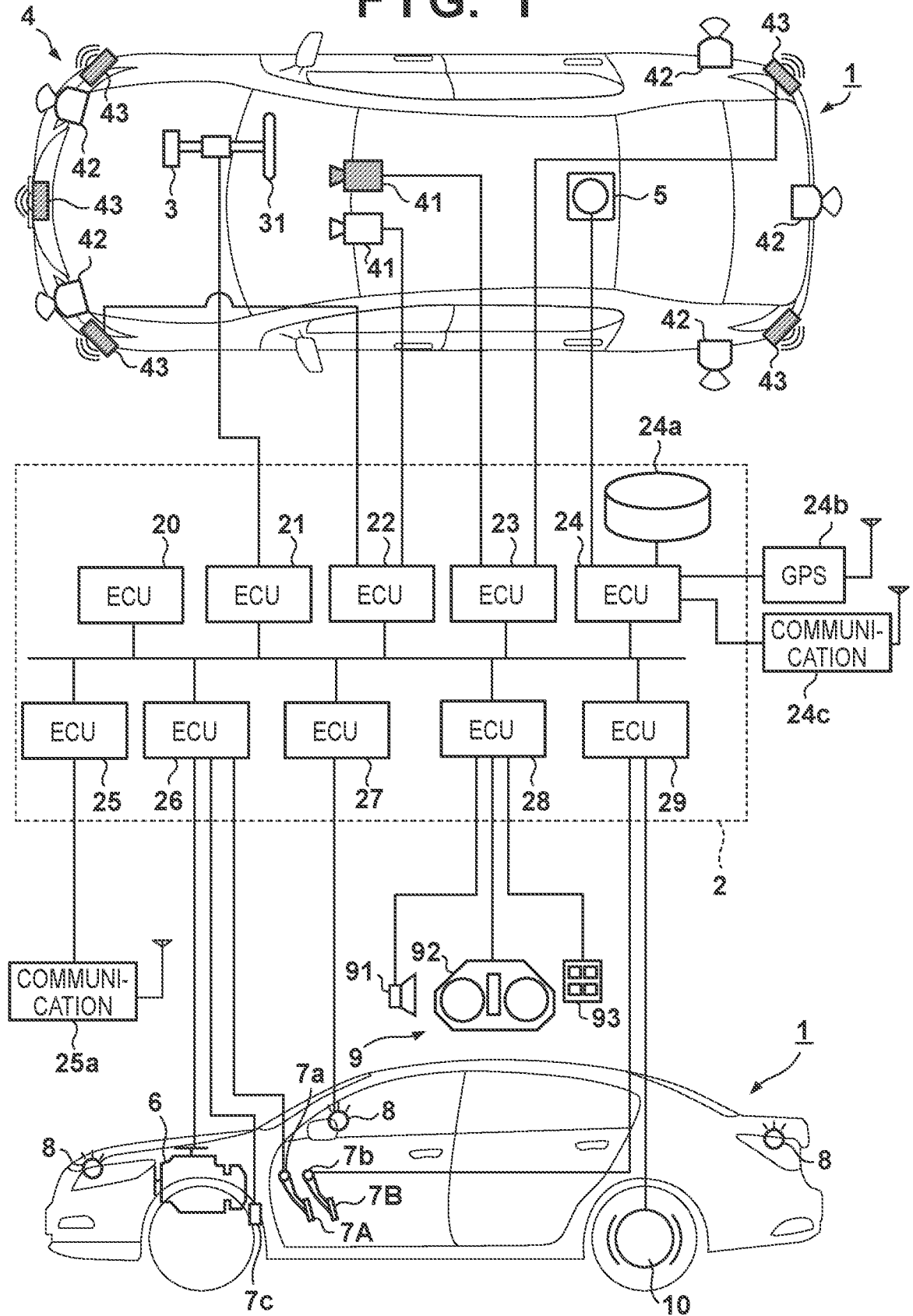
FIG. 1 is a diagram showing a configuration of a vehicular control device.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a block diagram of a vehicular control device (driving control device) according to one embodiment of the present invention that controls a vehicle 1. In FIG. 1, schematic plan and side views of the vehicle 1 are shown. The vehicle 1 is a four wheel sedan-type passenger car as an example.

The control device of FIG. 1 includes a control unit 2. The control unit 2 includes a plurality of ECUs 20 to 29 communicably connected by an internal network. Each ECU includes a processor typified by a CPU, a storage device such as a semiconductor memory, and an interface with external devices. The storage device stores programs to be executed by the processor, data to be used in processing by the processor, and the like. Each ECU may be provided with a plurality of processors, storage devices, interfaces, and the like. Also, the control device in FIG. 1 can be configured as a computer that carries out the present invention according to programs.

Hereinafter, the functions and the like provided by each of the ECUs 20 to 29 will be described. Note that the number of ECUs and the functions provided can be designed as appropriate, and the functions can be subdivided more than the present embodiment or can be consolidated.

The ECU 20 executes control related to automated driving of the vehicle 1. In automated driving, at least one of steering and acceleration/deceleration of the vehicle 1 is automatically controlled. In an example control described later, both steering and acceleration/deceleration are automatically controlled.

The ECU 21 controls a power steering device 3. The power steering device 3 includes a mechanism that steers the front wheels according to a driving operation (steering operation) of a steering wheel 31 by the driver. Also, the power steering device 3 includes a motor that generates driving force for assisting the steering operation or automatically steering the front wheels, and a sensor that detects the steering angle. In the case where the operational state of the vehicle 1 is automated driving, the ECU 21 automatically controls the power steering device 3 in response to instructions from the ECU 20, and controls the direction of travel of the vehicle 1.

The ECUs 22 and 23 perform control of detection units 41 to 43 that detect the situation around the vehicle, and information processing of detection results. The detection unit 41 is a camera (hereinafter, may be referred to as camera 41) that shoots forward of the vehicle 1, and, in the case of the present embodiment, is attached on the vehicle interior side of a front window at a front part of the roof of the vehicle 1. Object contour extraction and extraction of lane dividing lines (white lines, etc.) on the road is possible, through analysis of images shot by the camera 41.

The detection unit 42 is a Light Detection and Ranging (LiDAR) sensor that detects objects around the vehicle 1 and measures the distance to objects. In the case of the present embodiment, five detection units 42 are provided, with one provided in each corner part of the front part of the vehicle 1, one provided in the middle of the rear part, and one provided on each side of the rear part. The detection unit 43 is a mmwave radar (hereinafter, may be referred to as radar 43) that detects objects around the vehicle 1 and measures the distance to objects. In the case of the present embodiment, five radars 43 are provided, with one being provided in the middle of the front part of the vehicle 1, one being provided in each corner part of the front part, and one being provided in each corner part of the rear part.

The ECU 22 performs control of one camera 41 and the detection units 42, and information processing of detection results. The ECU 23 performs control of the other camera 41 and the radars 43, and information processing of detection results. The reliability of detection results can be improved, by providing two sets of devices that detect the situation around the vehicle, and analysis of the situation around the vehicle can be performed in a multifaceted manner, by providing different types of detection units such as cameras and radars.

The ECU 24 performs control of a gyroscope sensor 5, a GPS sensor 24b and a communication device 24c, and information processing of detection results or communication results. The gyroscope sensor 5 detects rotational movement of the vehicle 1. The route of the vehicle 1 can be determined by the detection results of the gyroscope sensor 5, wheel speed, and the like. The GPS sensor 24b detects the current position (e.g., latitude and longitude) of the vehicle 1. The communication device 24c performs server and wireless communication that provide map information, traffic information and weather information, and acquires this information. The ECU 24 is capable of accessing a database 24a built in the storage device. The database 24a is a database for map information, for example, and the ECU 24 performs route searches to destinations from the current location, and the like. Also, in the present embodiment, the database 24a includes a database in which speed information of the vehicle 1 is stored in association with time information. Also, a database for the above traffic information or weather information may be built as the database 24a.

The ECU 25 is provided with a communication device 25a for vehicle-to-vehicle communication and road-to-vehicle communication. The communication device 25a performs wireless communication with other vehicles in the vicinity, and executes vehicle-to-vehicle information exchange. The communication device 25a has various types of communication functions, such as a Dedicated Short Range Communications (DSRC) function and a cellular communication function, for example. The communication device 25a may be constituted as a TCU (Telematics Communication Unit) that includes a transceiver antenna. DSRC is a unidirectional or bidirectional short to medium range communication function, and enables high-speed vehicle-to-vehicle and vehicle-to-road data communication.

The ECU 26 controls a power plant 6. The power plant 6 is a mechanism that outputs driving force that rotates the drive wheels of the vehicle 1, and includes an engine and a transmission, for example. The ECU 26 controls output of the engine in response to a driving operation (accelerator operation or acceleration operation) by the driver detected by an operation detection sensor 7a provided in an accelerator pedal 7A, or changes the gear ratio of the transmission based on information such as vehicle speed detected by a vehicle speed sensor 7c, for example. In the case where the operational state of the vehicle 1 is automated driving, the ECU 26 automatically controls the power plant 6 in response to instructions from the ECU 20, and controls acceleration/deceleration of the vehicle 1.

The ECU 27 controls lights (headlights, taillights, etc.) including a direction indicator 8 (blinker). In the case of the example in FIG. 1, the direction indicator 8 is provided in the front part, door mirrors and rear part of the vehicle 1.

The ECU 28 controls an input/output device 9. The input/output device 9 receives output of information to the driver and input of information from the driver. An audio output device 91 notifies information by audio to the driver. A display device 92 notifies information by image display to the driver. The display device 92 is disposed in front of the driver's seat, for example, and constitutes an instrument panel or the like. Note that audio and display are illustrated here, but information may be notified by vibration, light or the like. Also, information may be notified by combining two or more of audio, display, vibration and light. Furthermore, the combination may be changed, according to the level (e.g., urgency) of information to be notified. Also, the display device 92 includes a navigation device.

An input device 93 is disposed in a position operable by the driver, and is a group of switches for instructing the vehicle 1, but may include an audio input device.

The ECU 29 controls a brake device 10 and a parking brake (not illustrated). The brake device 10 is a disc brake device, for example, is provided in each wheel of the vehicle 1, and decelerates or stops the vehicle 1 by applying resistance to the rotation of the wheels. The ECU 29 controls the operation of the brake device 10 in response to a driving operation (brake operation) by the driver detected by an operation detection sensor 7b provided in a brake pedal 7B, for example. In the case where the operational state of the vehicle 1 is automated driving, the ECU 29 automatically controls the brake device 10 in response to instructions from the ECU 20, and controls deceleration and stopping of the vehicle 1. The brake device 10 and the parking brake can be operated in order to maintain the stopped state of the vehicle 1. Also, in the case where the transmission of the power plant 6 is provided with a parking brake mechanism, this mechanism can also be operated in order to maintain the stopped state of the vehicle 1.

Control related to automated driving of the vehicle 1 that is executed by the ECU 20 will now be described. When a destination and automated driving are instructed by the driver, the ECU 20 automatically controls the vehicle 1 to travel toward the destination, in accordance with a guidance route found by the ECU 24. At the time of automated control, the ECU 20 acquires information (external environment information) relating to the situation around the vehicle 1 from the ECUs 22 and 23, and controls steering and acceleration/deceleration of the vehicle 1 by instructing the ECUs 21, 26 and 29 based on the acquired information. Information relating to the situation around the vehicle 1 includes other vehicles, pedestrians, signs, public equipment such as traffic lights, and the like, for example.

Figure 2:
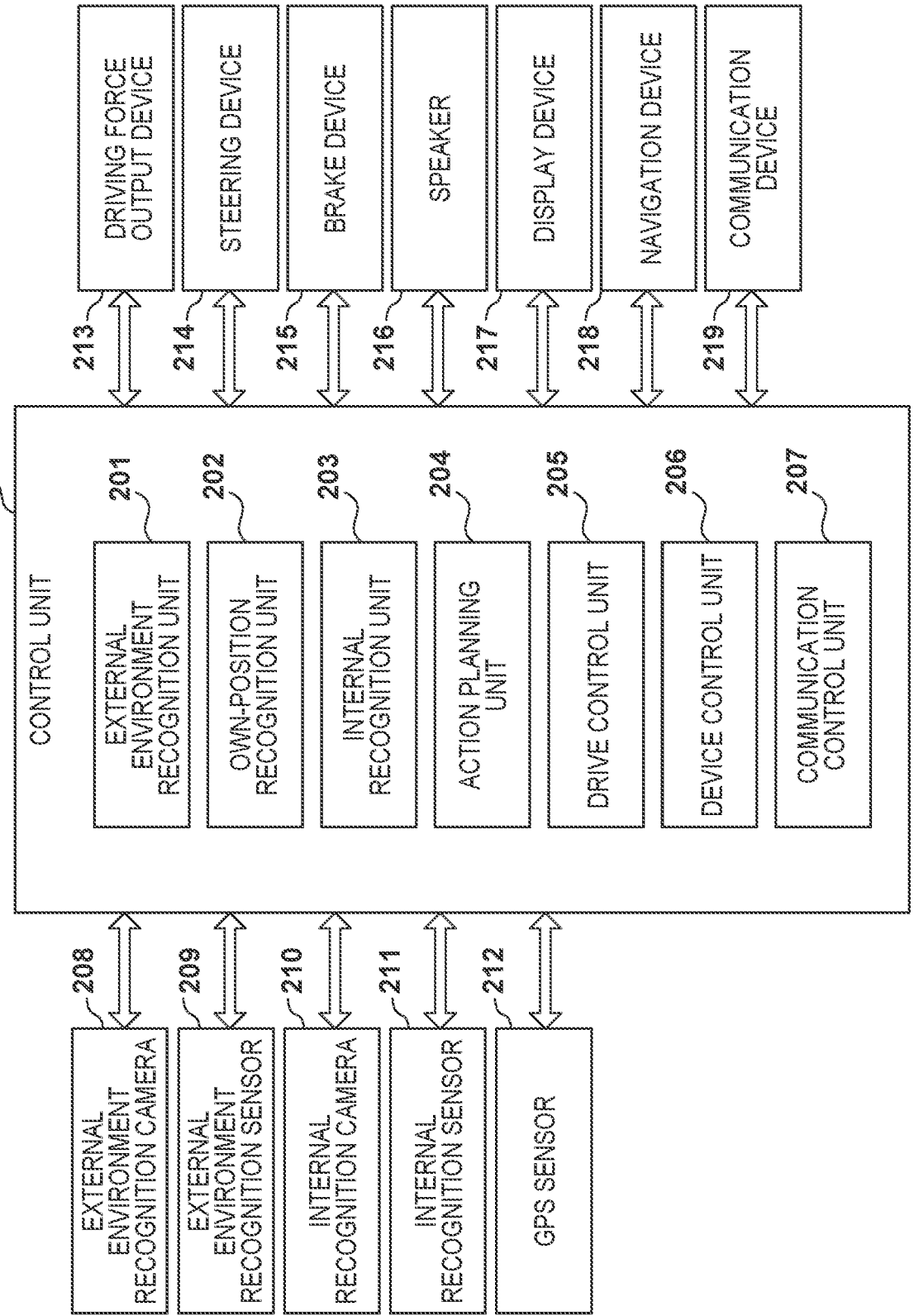
FIG. 2 is a diagram showing functional blocks of a control unit.

FIG. 2 is a diagram showing functional blocks of the control unit 2. A control unit 200 corresponds to the control unit 2 in FIG. 1, and includes an external environment recognition unit 201, an own-position recognition unit 202, an internal recognition unit 203, an action planning unit 204, a drive control unit 205, a device control unit 206, and a communication control unit 207. Each block is realized by one or a plurality of the ECUs shown in FIG. 1.

The external environment recognition unit 201 recognizes external environment information of the vehicle 1 through image recognition and signal analysis, based on signals from an external environment recognition camera 208 and an external environment recognition sensor 209. Here, the external environment recognition camera 208 is the camera 41 in FIG. 1, and the external environment recognition sensor 209 is the detection units 42 and 43 in FIG. 1. The external environment recognition unit 201 recognizes scenes such as intersections, railway crossings and tunnels, free spaces such as road shoulders, and the behavior (speed and direction of travel) of other vehicles, based on signals from the external environment recognition camera 208 and the external environment recognition sensor 209. The own-position recognition unit 202 recognizes the current position of the vehicle 1 based on signals from a GPS sensor 212. Here, the GPS sensor 212 corresponds to the GPS sensor 24b in FIG. 1, for example.

The internal recognition unit 203 identifies an occupant of the vehicle 1 and recognizes the state of the occupant, based on signals from an internal recognition camera 210 and an internal recognition sensor 211. The internal recognition camera 210 is a near-infrared camera installed on the internal display device 92 of the vehicle 1, for example, and detects the direction of the line-of-sight of the occupant, for example. Also, the internal recognition sensor 211 is a sensor that detects biosignals of the occupant, for example. The internal recognition unit 203 recognizes that the occupant is in states such as dozing or doing something other than driving, based on these signals.

The action planning unit 204 plans the action of the vehicle 1, such as the optimal route or a risk averse route, based on the result of recognition by the external environment recognition unit 201 and the own-position recognition unit 202. The action planning unit 204 performs approach determination that is based on start points and end points such as intersections and railway crossings, and action planning that is based on behavior prediction of other vehicles, for example. The drive control unit 205 controls a driving force output device 213, a steering device 214 and a brake device 215, based on the action planning by the action planning unit 204. Here, the driving force output device 213 corresponds to the power plant 6 in FIG. 1, the steering device 214 corresponds to the power steering device 3 in FIG. 1, and the brake device 215 corresponds to the brake device 10, for example.

The device control unit 206 controls devices that are connected to the control unit 200. For example, the device control unit 206 controls a speaker 216 to output predetermined audio messages such warnings and messages for navigation. Also, for example, the device control unit 206 controls a display device 217 to display predetermined interface screens. The display device 217 corresponds to the display device 92, for example. Also, for example, the device control unit 206 controls a navigation device 218 and acquires setting information of the navigation device 218.

The communication control unit 207 generates communication data in accordance with various types of communication protocols, and performs vehicle-to-vehicle communication and road-to-vehicle communication by transmitting and receiving communication data via a communication device 219. As for the communication method, DSRC is used, for example. By using DSRC, the communication control unit 207 functions as a DSRC in-vehicle device, enabling vehicle-to-vehicle communication with other communication systems that use DSRC and road-to-vehicle communication with roadside equipment (RSE). The communication control unit 207 is also capable of communicating with mobile terminals that support DSRC. The DSRC communication protocol is constituted to include the physical layer, data link layer and application layer of the seven layers of OSI (Open System Interconnection), and communication data is generated in at least one of the layers. Also, as for other communication methods, cellular communication is used, for example. By using cellular communication, the communication control unit 207 functions as a cellular communication in-vehicle device, enabling vehicle-to-vehicle communication with communication systems that use other cellular lines and road-to-vehicle communication with roadside equipment (RSE). Also, the communication protocol of cellular communication is constituted to include the physical layer, data link layer and application layer of the seven layers of OSI (Open System Interconnection), and communication data is generated in at least one of the layers.

The control unit 200 may include functional blocks other than shown in FIG. 2 as appropriate, and may, for example, include an optimal route calculation unit that calculates an optimal route to a destination based on map information acquired via the communication device 24c. Also, the control unit 200 may acquire information from other than the cameras and sensors shown in FIG. 2, and may, for example, be configured to acquire information of other vehicles via the communication device 25a. Also, the control unit 200 receives detection signals from various types of sensors provided in the vehicle 1, not only the GPS sensor 212. For example, the control unit 200 receives detection signals of opening/closing sensors of doors and mechanism sensors of door locks provided in door parts of the vehicle 1 via ECUs constituted in the door parts. The control unit 200 is thereby able to detect lock release of doors and opening/closing operation of doors.

Figure 3:
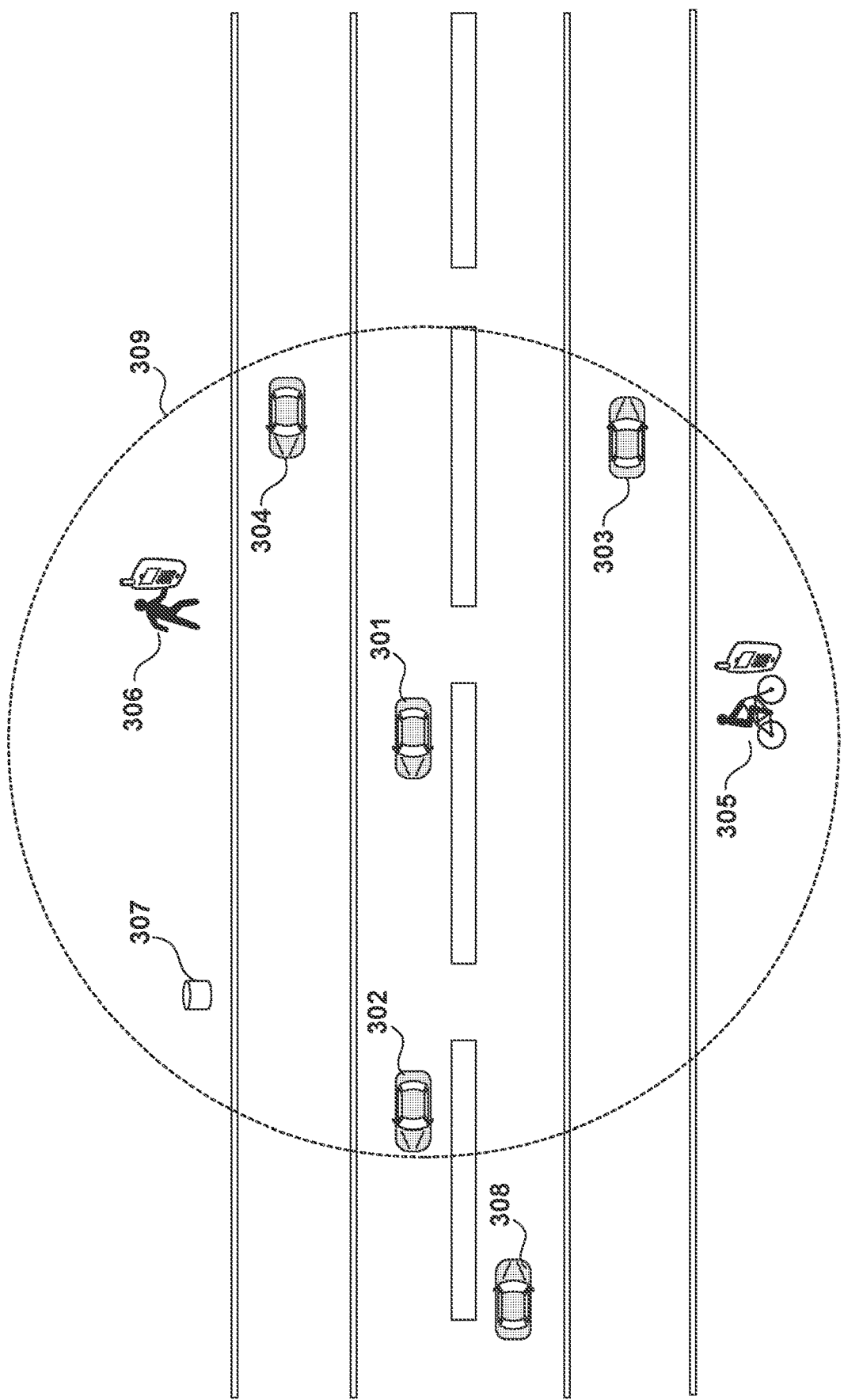
FIG. 3 is a diagram for describing a communication system.

Next, operations of the present embodiment will be described, with reference to FIG. 3. FIG. 3 shows a dual-lane roadway separated by a median strip. Also, FIG. 3 shows a roadside strip having been provided along the roadway. In FIG. 3, vehicles 301, 302, 303, 304 and 308 are traveling along the roadway, and a pedestrian 306 and a human-powered bicycle 305 are moving along the roadside strip. Also, roadside equipment capable of communication according to the above methods (hereinafter, may also be simply referred to as communication) is provided on the roadside strip. Also, the pedestrian 306 and the rider of the bicycle 305 are carrying mobile terminals. The vehicles, mobile terminals and roadside equipment are communication devices (communication terminals) capable of communication, and can each be both a transmission-side terminal and a reception-side terminal. FIG. 3 shows the vehicle 301 as a transmission-side terminal, and a communication range 309 indicates the communication range available for vehicle-to-vehicle communication and road-to-vehicle communication by the vehicle 301 in the case where the communication method is a short-range or near-field communication method such as DSRC, for example. The communication range also depends on factors such as radio wave intensity, and is several tens to several hundreds of meters, for example.

The vehicle 301 is capable of communicating with other communication devices in the communication range 309. Here, the communication devices include the DSRC in-vehicle devices, cellular communication in-vehicle devices and units constituted as TCUs (including transceiver antennas) installed in the vehicles 302, 303 and 304, the mobile terminals carried by the pedestrian 306 and the rider of the bicycle 305, and the roadside equipment. In other words, the communication devices include devices installed in moving bodies such as vehicles, mobile terminals, and equipment provided on the road and the like. In the present embodiment, the vehicle 301 performs broadcast transmission (broadcast communication) of communication data to communication devices within the communication range 309. In order to communicate with a specific communication target within the communication range 309, the vehicle 301 includes identification information for identifying the communication target in the communication data. A communication device serving as a communication target recognizes itself as being targeted due to the identification information in the received communication data, and continues subsequent communication. On the other hand, a communication device that is not a communication target recognize itself as not being targeted due to the identification information in the communication data, and discards the received communication data and ends communication with the vehicle 301.

Here, identification information will be described. In the present embodiment, identification information includes position information of a communication device serving as a communication target and range information determined based on the position information. A communication device serving as a communication target (reception-side terminal) recognizes that received communication data is addressed to itself, if the current position of the communication device is included in the area indicated by the position information and range information in the received communication data. On the other hand, the communication device recognizes that the received communication data is not addressed to itself, if the current position of the communication device is not included in the area indicated by the position information and range information in the received communication data. In this way, in the present embodiment, identification information that is based on the position information of a communication target is used, rather than using ID information that is based on a predetermined rule such as letters or numbers. As a result, a communication system can be built that is capable of identifying communication targets in a simple and appropriate manner, without requiring either a high level of uniqueness in a fixed amount of information or adjustment of the intensity or frequency of radio waves, or the like.

Figure 4:
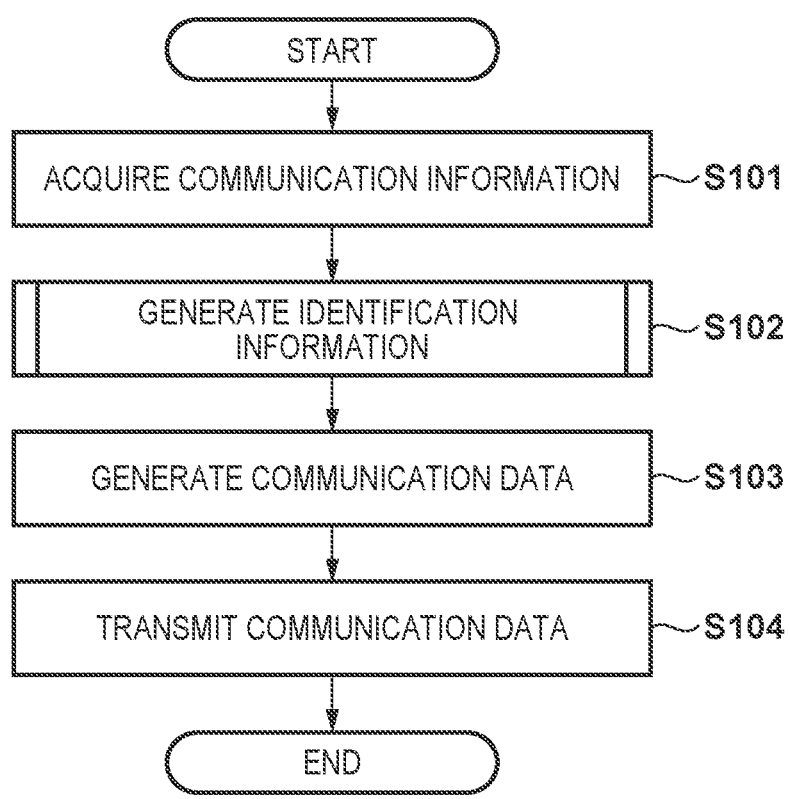
FIG. 4 is a flowchart showing processing that is performed in the case of transmitting communication data.

FIG. 4 is a flowchart showing processing for transmitting communication data. The processing of FIG. 4 is realized, for example, by the control unit 200 reading out and executing a program that is stored in a storage area such as ROM. In the following description, the vehicle 301 is the transmission-side terminal, and the vehicle 302 serving as a communication target will be described as the reception-side terminal.

In step S101, the control unit 200 of the vehicle 301 (hereinafter, simply control unit 200) acquires communication information to be transmitted to the vehicle 302. In the present embodiment, communication information is not particularly limited with regard to content as long as the information is transmitted or received with respect to a communication device targeted for communication, and, for example, may be behavior information (speed, route, etc.) of the vehicle, instruction information to other vehicles (e.g., request for another vehicle to pull over to the side of the road), traffic information, and the like. Also, communication information may be externally acquired information, or may be information generated in the vehicle 301.

In step S102, the control unit 200 generates identification information for identifying the communication device targeted for communication. The processing of step S102 will be described with reference to FIG. 5.

Figure 5:
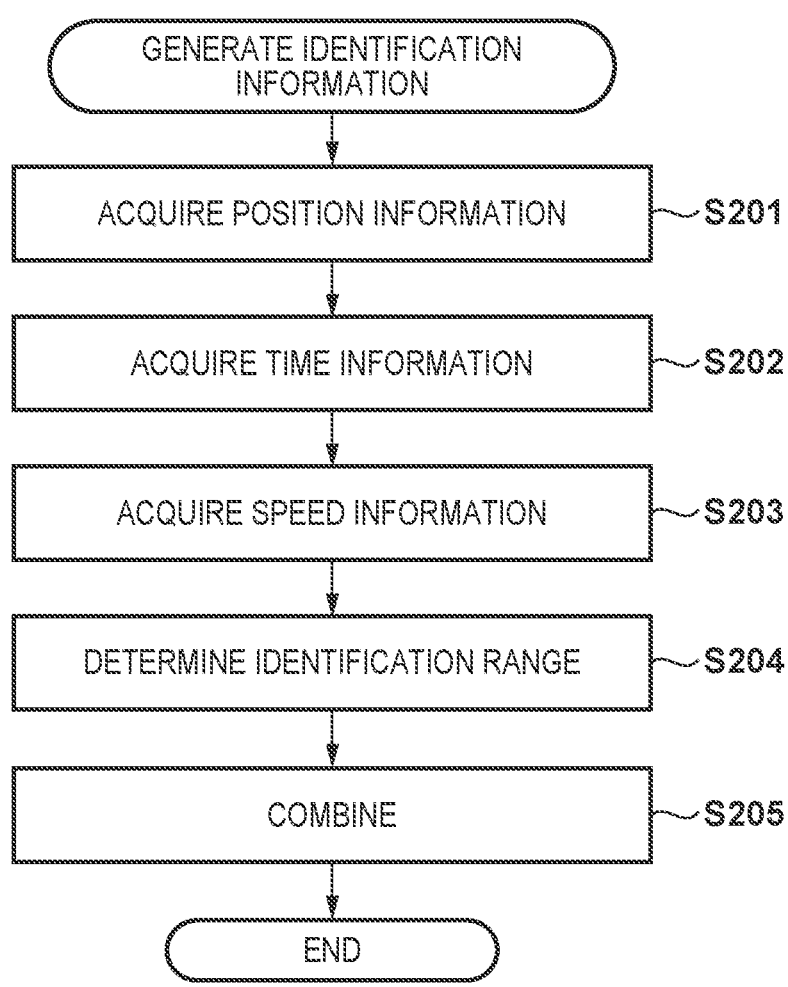
FIG. 5 is a flowchart showing identification information generation processing.

FIG. 5 is a flowchart showing the processing of step S102. In step S201, the control unit 200 acquires position information of the vehicle 302. For example, the external environment recognition unit 201 of the vehicle 301 acquires the inter-vehicle distance between the vehicle 301 and the vehicle 302, by performing image recognition on images shot by the external environment recognition camera 208, or signal analysis on detection signals of the external environment recognition sensor 209. The external environment recognition unit 201 then derives an absolute position of the vehicle 302, based on the acquired inter-vehicle distance and current position information of the vehicle 301. Here, the absolute position is latitude and longitude, for example. Alternatively, the absolute position may be an ID for specifying coordinates on a map. Alternatively, the control unit 200 may acquire the absolute position of the vehicle 302, by referring to communication with an external server or map information of the database 24a.

In step S202, the control unit 200 acquires the time at which the position information of the vehicle 302 was acquired in step S201. In step S203, the control unit 200 acquires speed information of the vehicle 302. The control unit 200 may, for example, derive the speed of the vehicle 302 from the speed information of the vehicle 301 and the inter-vehicle distance to the vehicle 302. Also, the speed that is derived may be an absolute speed or may be a relative speed. Here, the case where the communication target is a vehicle, which is a moving body, is described, but in the case where the communication target is roadside equipment 307, the processing of step S203 need not be performed assuming that the speed information is zero, if the communication target being the roadside equipment 307 can be acquired from map information or traffic information, for example.

In step S204, the control unit 200 determines an identification range, according to the speed information of the vehicle 302 acquired in step S203. Here, the identification range refers to an area having a certain range that is based on the absolute position of the vehicle 302 acquired in step S201. For example, a circular range centered on the absolute position of the vehicle 302 may be determined as the identification range, or a square range centered on the absolute position of the vehicle 302 and having a predetermined length in each axial direction may be determined as the identification range. Also, the range may be determined so as to include the position of the vehicle 301 and the absolute position of the vehicle 302. Also, the identification range may be represented by a relative distance from the vehicle 302. Also, the control unit 200 determines the identification range, according to the speed information of the vehicle 302. Various criteria may be used when determining the identification range. For example, a configuration may be adopted in which the control unit 200 holds information such as a table in which speed information is associated with identification ranges in advance, and determines the identification range in accordance with this information. Also, for example, in the case where the speed of the vehicle 302 is less than or equal to a threshold value, based on the speed information acquired in step S203, the control unit 200 may determine the identification range so as to be smaller than a default, and in the case where the speed of the vehicle 302 is greater than the threshold value, the control unit 200 may determine to the identification range so as to be larger than the default.

In this way, by changing the identification range according to the moving speed of the communication target, the robustness of the judgment, in the reception-side terminal, of whether the communication device thereof is a communication target can be maintained with respect to fluctuation in the speed of the communication target, particularly at high speed.

Also, when determining the identification range, other information may be used rather than the speed information of the vehicle 302. For example, a configuration may be adopted in which the control unit 200 determines to reduce the identification range in the case where the degree of traffic congestion is recognized as being high based on traffic congestion information, and, conversely, determines to enlarge the identification range in the case where the degree of traffic congestion is recognized as being low. With such a configuration, a deterioration in identifiability can be prevented even in a traffic jam. Also, apart from the above, a plurality of criteria may be combined, when determining the identification range.

In step S205, the control unit 200 generates a combination of the position information acquired in step S201 and the identification range determined in step S204 as identification information. Thereafter, the processing of FIG. 5 is ended. After the end of the processing of FIG. 5, the processing advances to step S103 in FIG. 4.

In step S103, the control unit 200 generates communication data to transmit to the vehicle 302, using the communication information acquired in step S101 and the identification information generated in step S102.

Figure 9:
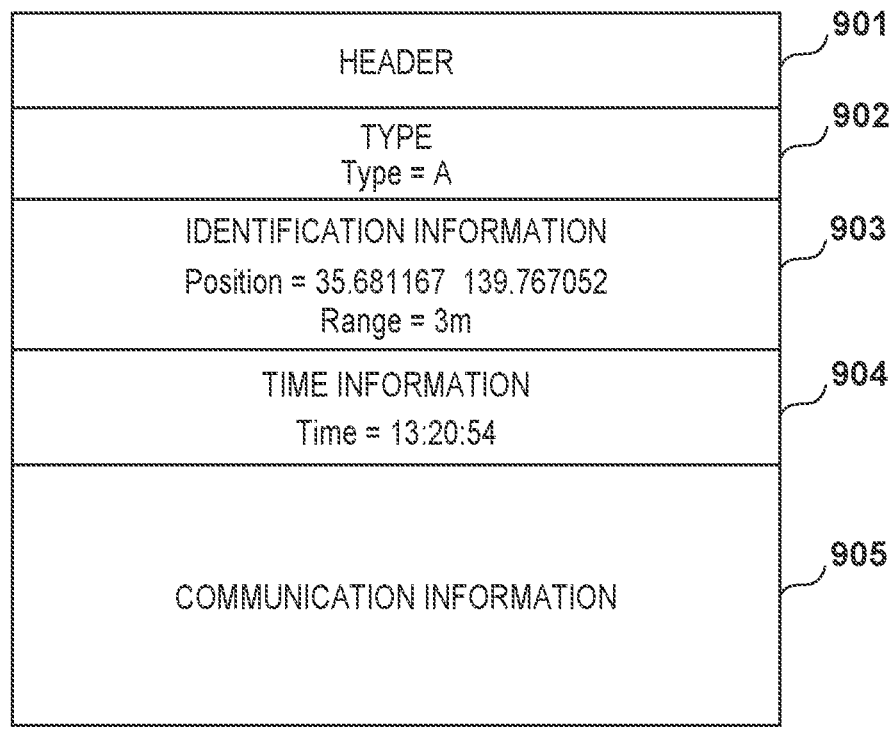
FIG. 9 is a diagram showing a format of communication data.

FIG. 9 is a diagram showing an example of a format of the communication data generated in step S103. In the case where DSRC is used as the communication protocol, communication data is transmitted in either the data link layer or the application layer, for example. As shown in FIG. 9, the communication data consists of a header 901 unique for each layer and a payload. The payload includes a type 902, identification information 903, time information 904, and communication information 905. The communication information 905 is the communication information acquired in step S101. The time information 904 is the time information acquired in step S202. The identification information 903 is the identification information generated in step S205. The type 902 is type information indicating whether the identification information 903 is information that requires referencing the time information 904. The type information will be described later.

After the communication data is generated in step S103, the control unit 200, in step S104, transmits the generated communication data via the communication device 219. At this time, as described with FIG. 3, broadcasting transmission of the communication data is performed within the communication range 309. After step S104, the processing of FIG. 4 is ended.

Next, the processing on the side of the vehicle serving as a communication target (reception-side terminal) will be described, with reference to FIG. 7. The vehicles 301, 302, 303, 304 and 308 traveling on the roadway execute the processing of FIG. 7 while traveling.

Figure 7:
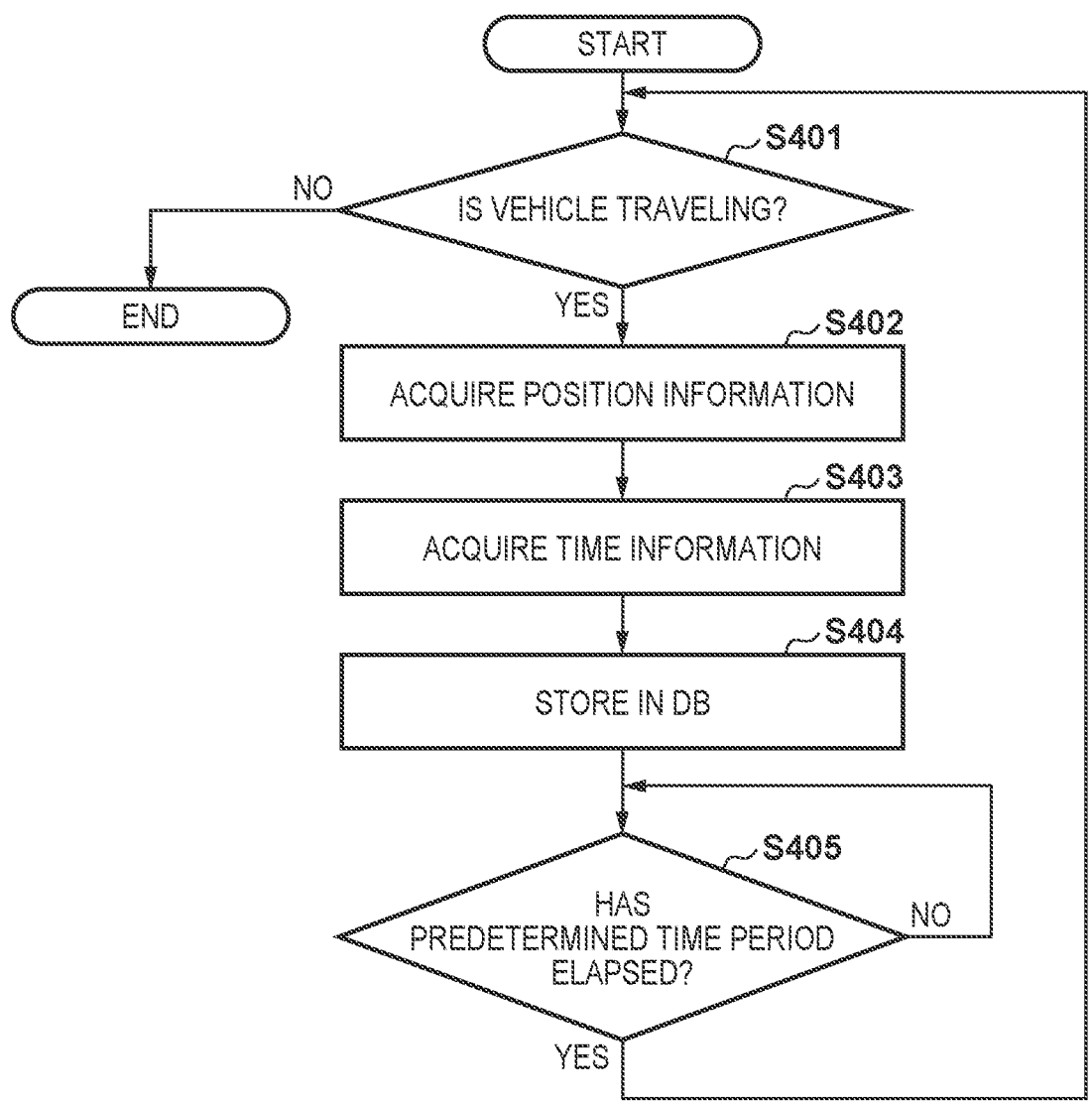
FIG. 7 is a flowchart showing processing that is performed while a vehicle is traveling.

FIG. 7 is a flowchart showing history information storage processing that is executed in a vehicle. The processing of FIG. 7 is, for example, realized by the control unit 200 reading out and executing a program that is stored in a storage area such as ROM.

In step S401, the control unit 200 determines whether the vehicle is traveling. Here, if it is determined that the vehicle is not traveling, the processing of FIG. 7 is ended. On the other hand, if it is determined that the vehicle is traveling, the processing advances to step S402.

In step S402, the control unit 200 acquires the position information of the vehicle. For example, the control unit 200 may acquire the position information of the vehicle with the GPS sensor 212. In step S403, the control unit 200 then acquires current time information. In other words, the time information that is acquired here indicate a time corresponding to the position of the vehicle acquired in step S402.

In step S404, the control unit 200 stores the position information acquired in step S402 and the time information acquired in step S403 in association with each other in the database 24a. In step S405, the control unit 200 waits for a predetermined time period to elapse. If it is determined that the predetermined time period has elapsed, the processing from step S401 is repeated.

As described above, the vehicles 301, 302, 303, 304 and 308 shown in FIG. 3 each store their respective speed information and time information in association with each other in the database 24a as history information while traveling. The processing of FIG. 7 was described as being executed in the vehicles 301, 302, 303, 304 and 308, but a configuration may be adopted in which the processing of FIG. 7 is executed in the mobile terminal that is being carried by the pedestrian 306 or the rider of the bicycle 305.

Figure 8:
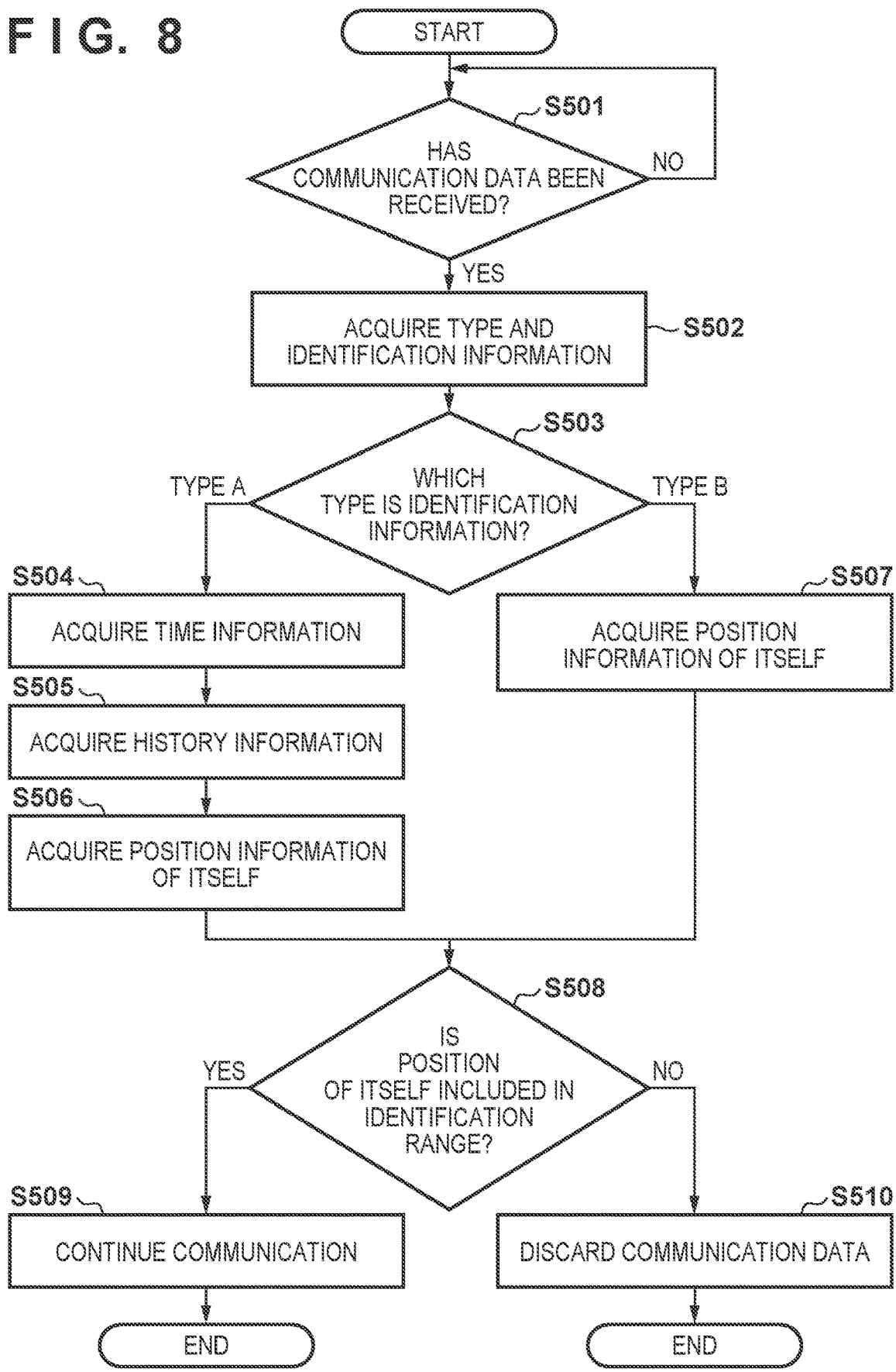
FIG. 8 is a flowchart showing processing in the case of receiving communication data.

Next, the processing that is executed when the vehicle 302 serving as a communication target receives communication data will be described, with reference to FIG. 8. The processing of FIG. 8 is, for example, realized by the control unit 200 reading out and executing a program that is stored in a storage area such as ROM.

In step S501, the control unit 200 of the vehicle 302 (hereinafter, simply control unit 200) determines whether communication data has been received. Here, if it is determined that communication data has been received, the processing advances to step S502, and if it is determined that communication data has not been received, the processing of step S501 is repeated.

In step S502, the control unit 200 acquires type information and identification information from the received communication data. The type information and identification information that are acquired here are the type 902 and the identification information 903 in FIG. 9. For example, a configuration may be adopted in which the control unit 200, upon identifying the header 901 corresponding to the layer of the received communication data, acquires the type 902 and the identification information 903, with reference to a field having a predetermined length from the head of the payload.

In step S503, the control unit 200 determines whether the identification information 903 is information that requires referencing the time information 904, depending on the type 902. Here, for convenience of description, it is assumed that if the content of the type 902 is "A", the identification information 903 is information that requires referencing the time information 904, and that if the content of the type 902 is "B", the identification information 903 is information that does not require referencing the time information 904.

If it is determined that the content of the type 902 is "A" in step S503, the control unit 200, in step S504, acquires the time information 904 from the received communication data. In step S505, the control unit 200 then acquires history information corresponding to the time of the time information 904 acquired in step S504 from the database 24a. In step S506, the control unit 200 then acquires the position information of the vehicle from the history information acquired in step S505.

In other words, upon receiving communication data, the vehicle 302 acquires the position of the vehicle at a time (past point in time) indicated by the time information included in the communication data. As described with FIG. 7, each vehicle accumulates history information of the vehicle in the database 24a while traveling, and thus the vehicle 302, having received the communication data, is able to acquire the position information of the vehicle at the time indicated by the time information 904. Note that, here, the case where the reception-side terminal is a vehicle is described, but the same also applies in the case of the mobile terminal that is being carried by the pedestrian 306 or the rider of the bicycle 305, and the position of the mobile terminal is acquired.

In step S508, the control unit 200 determines whether the position of the vehicle acquired in step S506, that is, the position of the vehicle at a past point in time, is included in the identification range indicated by the identification information 903 acquired in step S502. Here, if it is determined that the position of the vehicle is included in the identification range, the processing advances to step S509, and the control unit 200 continues communication with the transmission-side terminal, that is, the vehicle 301, and, for example, the control unit 200 acquires the content of the communication information 905, and executes processing such as control within the vehicle (drive control, notification to the driver, etc.) and response to the vehicle 301, according to the acquired content. After step S509, the processing of FIG. 8 is ended.

If it is determined in step S508 that the position of the vehicle not included in the identification range, the processing advances to step S510, and the control unit 200 judges that the communication data received in step S501 is not addressed to the vehicle, and discards the received communication data. That is, communication with the vehicle 301 is ended, without acquiring the content of the communication information 905. After step S510, the processing of FIG. 8 is ended.

Next, the case where it is determined in step S503 that the content of the type 902 is "B", that is, that the identification information 903 is information that does not require referencing the time information 904 will be described, with reference to FIGS. 6 and 8.

Figure 6:
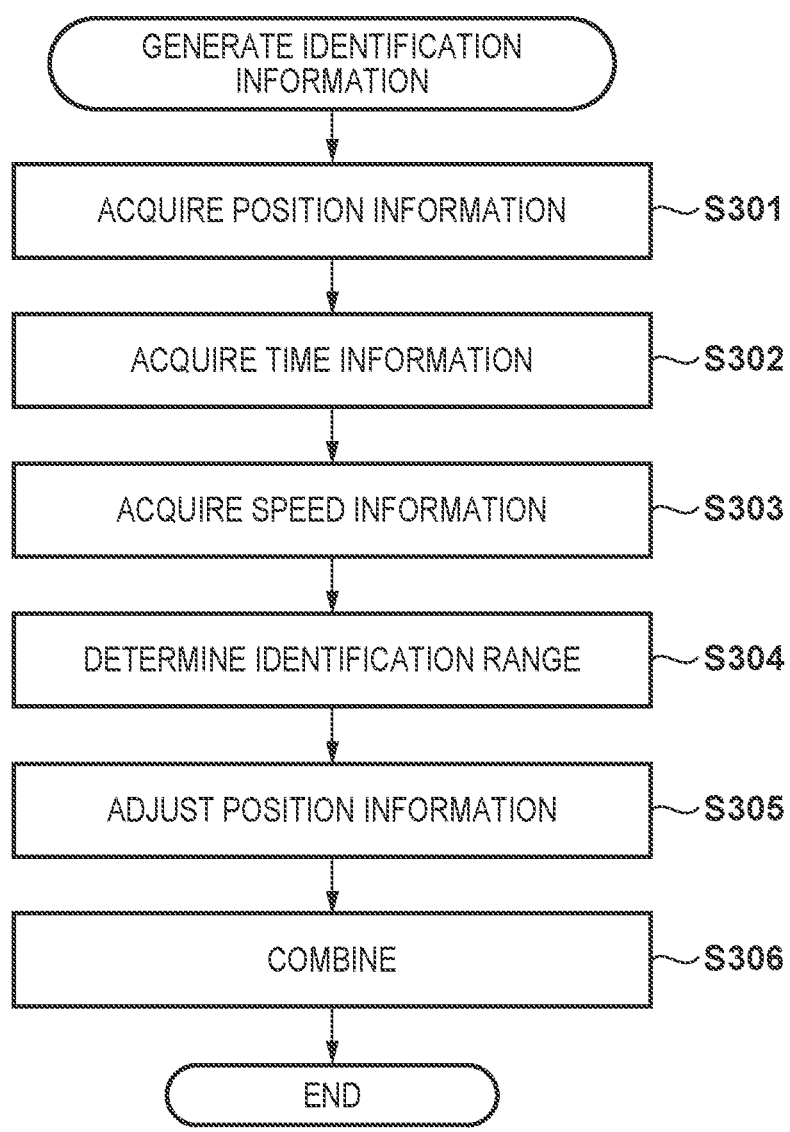
FIG. 6 is a flowchart showing identification information generation processing.

FIG. 6 is another flowchart showing the processing of step S102. Since steps S301 to S304 are the same as the description in steps S201 to S204 of FIG. 5, description thereof will be omitted. In FIG. 6, the control unit 200 of the vehicle 301 (hereinafter, simply control unit 200), in step S305, adjusts the position information of the vehicle 302 acquired in step S301.

In the position information adjustment of step S305, the control unit 200 calculates the movement distance of the vehicle 302, based on the speed information of the vehicle 302 acquired in step S303 and a predetermined time period, and derives a position moved by the calculated amount of movement from the position of the vehicle 302 indicated by the position information acquired in step S301. In step S306, the control unit 200 then generates, as identification information, a combination of the position information adjusted in step S305 and the result of adjusting the identification range determined in step S304 according to the adjustment amount of step S305. Thereafter, the processing of FIG. 6 is ended, and the processing advances to step S103 in FIG. 4. The predetermined time period that is used in order to calculate the movement distance of the vehicle 302 is, for example, a time period that can be determined by the specifications and corresponds to the difference between the acquisition time of step S301 and the transmission time of step S104.

In the processing of FIG. 5, the control unit 200 of the vehicle 301 transmits identification information that is based on the position information of the vehicle 302 to the vehicle 302, and also transmits the acquisition time of the position information together therewith. On the vehicle 302 side, the position where the vehicle was located at the received acquisition time is acquired from the history information of the database 24a of the vehicle, and is compared with the identification range of the received identification information. On the other hand, in the processing of FIG. 6, the control unit 200 of the vehicle 301, upon acquiring the position information of the vehicle 302, adjusts the acquired position information, with consideration for the vehicle 302 moving before the communication data is transmitted. The control unit 200 of the vehicle 301 includes information to the effect that "the identification information 903 is information that requires referencing the time information 904" in the type 902, in the case where the identification information 903 is generated by the processing of FIG. 5. This is because it is necessary, on the vehicle 302 side, to acquire position information from the history information of the database 24a using the time information 904. On the other hand, the control unit 200 of the vehicle 301 includes information to the effect that "the identification information 903 is information that does not require referencing the time information 904" in the type 902, in the case where the identification information 903 is generated by the processing of FIG. 6.

Referring again to FIG. 8, if it is determined in step S503 that the content of the type 902 is "B", that is, that the identification information 903 is information that does not require referencing the time information 904, the control unit 200 of the vehicle 302, in step S507, acquires the current position information of the vehicle. For example, the control unit 200 acquires the current position information of the vehicle with the GPS sensor 212. Thereafter, the processing from step S508 is performed, as already described.

In this way, in the case where the control unit 200 of the vehicle 301 generates the identification information 903 by the processing of FIG. 6, processing for acquiring history information from the database 24a is not performed in the vehicle 302. As a result, the processing load on the vehicle 302 side can be reduced.

The control unit 200 of the vehicle 301 was described as including information to the effect that "the identification information 903 is information that does not require referencing the time information 904" in the type 902, in the case where the identification information 903 is generated by the processing of FIG. 6, but other configurations may be adopted. For example, in the case where the identification information 903 is generated by the processing of FIG. 6, time information obtained by adding the predetermined time period used in step S305 to the current time may be transmitted as the time information 904. In that case, a configuration may be adopted in which, in the vehicle 302, the received time information 904 is compared with the current time, and, if matched, the determination of step S508 is performed.

Hereinabove, it was assumed that the vehicle 302 serving as the communication target is moving at a uniform speed. However, there may also be cases where the vehicle 302 accelerates or decelerates. Hereinafter, such cases will be described.

Figure 10:
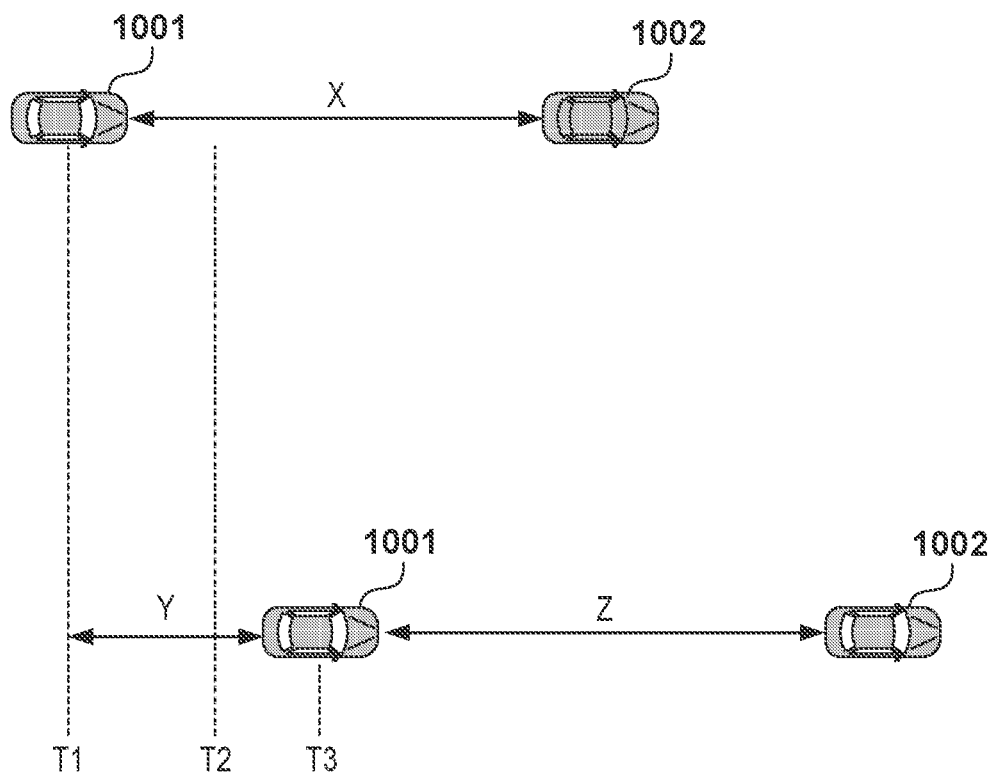
FIG. 10 is a diagram for describing the positional relationship between vehicles.

FIG. 10 is a diagram in which vehicles that communicate in the present embodiment are shown to be traveling, similarly to FIG. 3. A vehicle 1001 corresponds to the vehicle 301 in FIG. 3, and a vehicle 1002 corresponds to the vehicle 302 in FIG. 3. Also, the vehicle 1001 in the lower half is shown as having moved a distance Y corresponding to a time period T3-T1 from the position of the vehicle 1001 in the upper half. In the case where the vehicle 1001 is following behind the vehicle 1002 and the vehicle 1002 is moving at a uniform speed, an inter-vehicle distance X and an inter-vehicle distance Z are equal. Also, in the case where the vehicle 1002 accelerates, the inter-vehicle distance Z becomes larger than the inter-vehicle distance X, and, in the case where vehicle 1002 decelerates, the inter-vehicle distance Z becomes smaller than the inter-vehicle distance X.

As described above, in the case where the speed of the vehicle 1002 fluctuates, the vehicle 1001 monitors the fluctuation in speed of the vehicle 1002 in the period from times T1 to T2 that elapses before transmission of the communication data. The position information of the vehicle 1002 is then adjusted, according to the amount of fluctuation.

Figure 11:
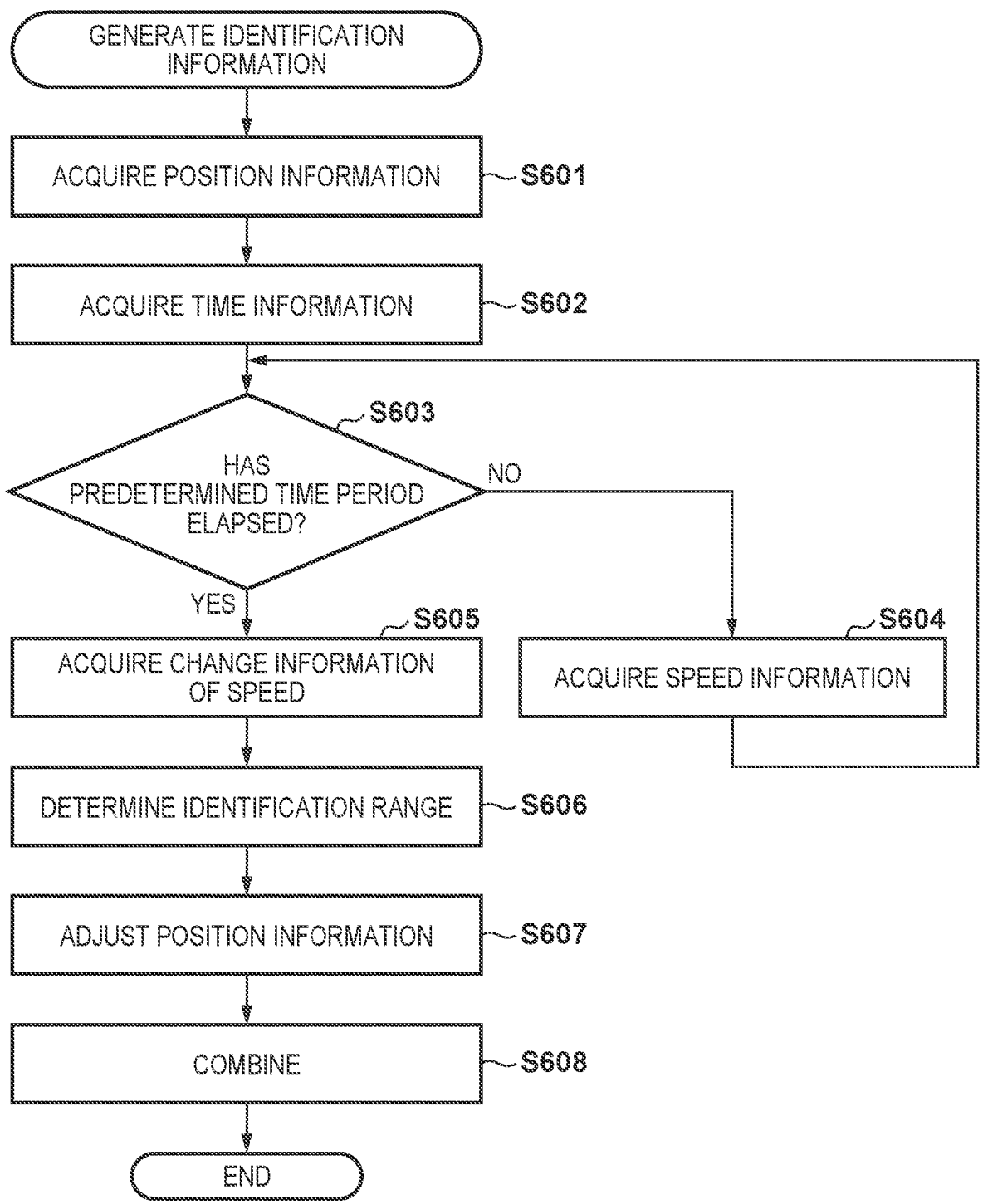
FIG. 11 is a flowchart showing identification information generation processing.

FIG. 11 is another flowchart showing the processing of step S102. Since steps S601 and S602 are the same as the description in steps S201 and S202 of FIG. 5, description thereof will be omitted. In FIG. 11, the control unit 200 of the vehicle 301 repeatedly acquires the speed information of the vehicle 302 during a predetermined time period, after acquiring the position information and time information of the vehicle 302.

In step S603, the control unit 200 determines whether the predetermined time period has elapsed. If it determined that the predetermined time period has not elapsed, the control unit 200, in step S604, acquires the speed information of the vehicle 302, similarly to step S203. The control unit 200 accumulates the acquired speed information in the storage area. Thereafter, the processing of step S603 is repeated. If it is determined in step S603 that the predetermined time period has elapsed, the processing advances to step S605.

In step S605, the control unit 200 derives the speed change of the vehicle 302 during the predetermined time period, based on the accumulated speed information. A configuration may be adopted in which the tendency of the change in speed during the predetermined time period is acquired as the speed change. For example, a configuration may be adopted in which the tendency of a linear change that is derived from the speed acquired first and the speed acquired last during the predetermined time period is acquired.

In step S606, the control unit 200 determines the identification range, based on the speed change information acquired in step S605. For example, a configuration may be adopted in which the control unit 200 enlarges the identification range as the rate of change in speed increases. Similarly, a configuration may be adopted in which the control unit 200 reduces the identification range as the rate of change in speed decreases.

In step S607, the control unit 200 adjusts the position information acquired in step S601, based on the speed change information acquired in step S605. For example, if, as a result of acquiring the change in speed in step S605, it is judged that constant acceleration/deceleration is being performed by the vehicle 302, an adjustment operation of the position on the line of travel is performed, after having performed processing similar to step S305 on the position information acquired in step S601.

In step S608, the control unit 200 generates, as identification information, a combination of the position information adjusted in step S607 and the result of adjusting the identification range determined in step S606 according to the adjustment amount of step S607. Thereafter, the processing of FIG. 11 is ended, and the processing advances to step S103 in FIG. 4. Note that in the case where the identification information is generated by the processing of FIG. 11, the control unit 200, in step S103, includes information to the effect that "the identification information 903 is information that does not require referencing the time information 904" in the type 902.

Alternatively, similarly to FIG. 6, time information obtained by adding the predetermined time period used in step S607 to the current time may be transmitted as the time information 904. In that case, a configuration may be adopted in which, in the vehicle 302, the received time information 904 is compared with the current time, and, if matched, the determination of step S508 is performed.

As described above, according to the present embodiment, a communication system can be built that is capable of identifying communication targets in a simple and appropriate manner, without requiring either a high level of uniqueness in a fixed amount of information or adjustment of the intensity or frequency of radio waves, or the like.

Summary of Embodiment

A communication system of the above embodiment includes a transmission-side terminal and a reception-side terminal, the transmission-side terminal including a transmission unit (FIGS. 4, 9) configured to transmit identification information in which a range including a position of a communication target is specified, and the reception-side terminal including a reception-side acquisition unit configured to acquire a position of the reception-side terminal (step S506, S507 of FIG. 8), and a control unit configured to perform control to continue communication with the transmission-side terminal, based on the identification information transmitted by the transmission unit and the position of the reception-side terminal acquired by the reception-side acquisition unit (steps S508, S509, S510 of FIG. 8). According to such a configuration, a communication target can be appropriately identified, using information of a range that includes the position of the communication target.

Also, at least one of the transmission-side terminal and the reception-side terminal is installed in a moving body (vehicles 301, 302). Also, at least one of the transmission-side terminal and the reception-side terminal is a mobile terminal (mobile terminal of the pedestrian 306 or the bicycle 305). According to such a configuration, a communication target can be appropriately identified, using information of a range that includes the position of the communication target, even in vehicle-to-vehicle communication and a communication system that includes mobile terminals.

Also, the transmission-side terminal further includes a transmission-side acquisition unit configured to acquire the position of the reception-side terminal (steps S201, S301, S601), and a specification unit configured to specify a range that includes the position of the reception-side terminal acquired by the transmission-side acquisition unit (steps S204, S304, S606). Also, the transmission-side acquisition unit acquires the position of the reception-side terminal, using at least one of a camera (external environment recognition camera 208) and a sensor (external environment recognition sensor 209) that are included in the transmission-side terminal. Also, the transmission-side acquisition unit acquires the position of the reception-side terminal, through external communication. According to such a configuration, the position of the communication target can be acquired based on map information acquired from a camera or sensor provided in a vehicle or from an external server, for example, and a range can be specified using the acquired position.

Also, the specification unit specifies the range including the position of the reception-side terminal acquired by the transmission-side acquisition unit, according to the moving speed of the reception-side terminal. Also, the specification unit specifies the range so as to include the position of the transmission-side terminal and the position of the reception-side terminal acquired by the transmission-side acquisition unit. According to such a configuration, specification of a range that is highly robust to fluctuation in the moving speed of the communication target can be performed.

Also, the reception-side terminal further includes a determination unit configured to determine whether the position of the reception-side terminal acquired by the reception-side acquisition unit is included in the range specified in the identification information transmitted by the transmission unit (step S508 of FIG. 8), and the control unit performs control to continue communication with the transmission-side terminal if it is determined by the determination unit that the acquired position is included the range specified in the identification information (step S509 of FIG. 8), and ends communication with the transmission-side terminal if it is determined by the determination unit that the acquired position is not included the range specified in the identification information (step S510 of FIG. 8). According to such a configuration, control for continuing communication can be performed, using information of a range that includes the position of the communication target.

Also, the transmission unit further transmits an acquisition time (time information 904) of the transmission-side acquisition unit. Also, the reception-side terminal further includes a storage unit (database 24a) configured to store history information in which positions of the reception-side terminal are associated with times, and the reception-side acquisition unit acquires the position of the reception-side terminal at the transmitted acquisition time from the storage unit. According to such a configuration, the position of the vehicle at the acquisition time can be acquired in the reception-side terminal, for example.

Also, the transmission-side acquisition unit calculates an amount by which the reception-side terminal moves before the identification information is transmitted by the transmission unit, and acquires the position of the reception-side terminal based on the calculated amount of movement (FIG. 6). Also, the transmission unit further transmits a time (time information 904) that depends on the calculated amount of movement. According to such a configuration, identification information based on position information that takes the amount of movement of the communication target into consideration can be transmitted.

Also, transmission of the identification information by the transmission unit is performed in a data link layer or an application layer of a communication protocol. According to such a configuration, transmission in the data link layer or application layer of DSRC, for example, can be performed.

The invention is not restricted to the above embodiments, and various change and modification can be made, without departing from spirit or scope of the invention. Accordingly, claims are appended to disclose the scope of the invention.

The invention claimed is:

1. A control method to be executed in a communication system including a transmission-side terminal and a reception-side terminal, the method comprising:
   the transmission-side terminal
   acquiring a position of the reception-side terminal and speed information of the reception-side terminal, using at least one of a camera and a sensor;
   determining an identification range including the position of the reception-side terminal, according to the acquired speed information of the reception-side terminal; and
   transmitting identification information in which the identification range including the position of the reception-side terminal is specified, and
   the reception-side terminal
   acquiring the position of the reception-side terminal;
   determining whether the position of the reception-side terminal is included in the identification range specified in the identification information transmitted from the transmission-side terminal; and
   performing control to continue communication with the transmission-side terminal, if it is determined that the position of the reception-side terminal is included in the identification range specified in the identification information, and performing control to end communication with the transmission-side terminal, if it is determined that the position of the reception-side terminal is not included in the identification range specified in the identification information.

2. The control method according to claim 1, wherein at least one of the transmission-side terminal and the reception-side terminal is installed in a moving body.

3. The control method according to claim 1, wherein at least one of the transmission-side terminal and the reception-side terminal is a mobile terminal.

4. The control method according to claim 1, wherein the transmission-side terminal acquires the position of the reception-side terminal through external communication.

5. The control method according to claim 1, wherein the transmission-side terminal determines the identification range to include a position of the transmission-side terminal and the position of the reception-side terminal.

6. The control method according to claim 1, wherein the transmission-side terminal further transmits a time at which the position of the reception-side terminal was acquired.

7. The control method according to claim 6, wherein the reception-side terminal further stores, in a storage unit, history information in which the position of the reception-side terminal is associated with a time, and
   the reception-side terminal unit acquires, from the storage unit, the position of the reception-side terminal at the transmitted acquisition time.

8. The control method according to claim 1, wherein the transmission-side terminal calculates an amount by which the reception-side terminal moves before the identification information is transmitted, and acquires the position of the reception-side terminal based on the calculated amount of movement.

9. The control method according to claim 8, wherein the transmission-side terminal further transmits a time that depends on the calculated amount of movement.

10. The control method according to claim 1, wherein transmission of the identification information is performed in a data link layer or an application layer of a communication protocol.

11. A communication terminal communicable with an external device, comprising:
    at least one processor, which executes instructions stored in at least one memory, being configured to:
    acquire a position of the communication terminal,
    receive identification information in which an identification range including the position of the communication terminal is specified from the external device,
    determine whether the position of the communication terminal is included in the identification range specified in the identification information transmitted from the external device, and
    perform control to continue communication with the external device if it is determined that the position of the communication terminal is included in the identification range specified in the identification information, and perform control to end communication with the external device, if it is determined that the position of the communication terminal is not included in the identification range specified in the identification information,
    wherein the identification range is determined according to speed information of the communication terminal.

12. The external device according to claim 11, comprising:
    at least one processor, which executes instructions stored in at least one memory, being configured to:
    acquire the position of the communication terminal, using at least one of a camera and a sensor, and
    transmit the identification information in which the identification range including the position of the communication terminal is specified.

13. A communication system including a transmission-side terminal and a reception-side terminal, the transmission-side terminal comprising:
    at least one processor, which executes instructions stored in at least one memory, being configured to:
    acquire a position of the reception-side terminal and speed information of the reception-side terminal, using at least one of a camera and a sensor, and determining an identification range including the position of the reception-side terminal, according to the acquired speed information of the reception-side terminal; and transmit identification information in which the identification range including the position of the reception-side terminal is specified, and the reception-side terminal comprising:
at least one processor, which executes instructions stored in at least one memory, being configured to:
acquire the position of the reception-side terminal,
determine whether the position of the reception-side terminal is included in the identification range specified in the identification information transmitted from the transmission-side terminal, and
perform control to continue communication with the transmission-side terminal, if it is determined that the position of the reception-side terminal is included in the identification range specified in the identification information, and perform control to end communication with the transmission-side terminal, if it is determined that the position of the reception-side terminal is not included in the identification range specified in the identification information.

14. The communication system according to claim 13, wherein at least one of the transmission-side terminal and the reception-side terminal is installed in a moving body.

15. The communication system according to claim 13, wherein at least one of the transmission-side terminal and the reception-side terminal is a mobile terminal.

16. The communication system according to claim 13, wherein the at least one processor of the transmission-side terminal acquires the position of the reception-side terminal through external communication.

17. The control method according to claim 1, wherein the identification range including the position of the reception-side terminal is determined to be smaller, in a case where the speed information is less than or equal to a threshold value, and is determined to be larger, in a case where the speed information is greater than the threshold value.

18. The communication system according to claim 13, wherein the identification range including the position of the reception-side terminal is determined to be smaller, in a case where the speed information is less than or equal to a threshold value, and is determined to be larger, in a case where the speed information is greater than the threshold value.

* * * * *